UNITED STATES PATENT OFFICE.

ISIDOR POLLAK, OF VIENNA, AUSTRIA-HUNGARY.

MALT EXTRACT AND METHOD OF MAKING SAME.

1,153,641. Specification of Letters Patent. Patented Sept. 14, 1915.

No Drawing. Application filed May 11, 1914. Serial No. 837,867.

*To all whom it may concern:*

Be it known that I, ISIDOR POLLAK, a subject of the Emperor of Austria-Hungary, and residing at Vienna, Austria-Hungary, have invented certain new and useful Improvements in Malt Extract and Method of Making Same, of which the following is a specification.

In the method of manufacturing diastase extracts from malt, hitherto used, it was impossible to exhaust the whole diastatic capacity of the malt, or even the main portion of the same, as in the assumption that diastase is very easily soluble, only a single extraction was made. The deficiency in diastase yielded by the manufacture of diastase preparations, was attributed to losses in working, so that all delay in the operations which, it was feared, would bring about an acidifying of the extract, and consequent further losses of diastase, was avoided. It has been found, however, that the deficiency in the quantity of diastase merely remains in the extracted malt (residue remaining after extracting) and is lost during the saccharification of the residue. This discovery leads first of all to the improvement of repeatedly extracting one body of malt, for the purpose of avoiding such losses of diastase.

In order to prevent formation of lactic acid injurious to the diastase, during the comparatively long time required for the repeated extraction and clarifying of the increased quantities of liquid, care is taken, by adding carbonate of lime or the like, to neutralize the lactic acid produced, or to keep the acidity of the mash always very low. In this way, it is possible to exhaust the diastase down to the very small amount necessary to saccharify the starch of the malt.

Hitherto a temperature of about 70° C. has been always used for the saccharification of the residue remaining after the draining of the wort, in the manufacture of diastase preparations. According to the present process, this temperature is reduced to 65-66° C. This not only results in the saccharification taking place in a more favorable manner, but the diastase is not injured by the heating. When the saccharification is completed, the wort is quickly drained, in order to bring it to a low temperature as quickly as possible. The wort thus obtained is then mixed with the diastase extracts first obtained, and the mixture is evaporated in a vacuum in the presence of reducing substances such as salts of the thiosulfuric acid ($H_2S_2O_3$) or salts of sulfoxylic acid ($H_2SO_2$), or of formaldehyde derivatives of the said salts.

The addition of the reducing agent in the vacuum apparatus has for its object to prevent the lactic acid bacteria from becoming active, without it being necessary to make them harmless by heating which would also affect to a considerable extent the diastase itself. At the temperatures which are used in the extraction, the injurious action of the lactic acid bacteria can be best eliminated by neutralizing the lactic acid formed by means of carbonate of lime. In evaporating, it is necessary to use reducing salts which, even when used in traces, contribute considerably to the increase of diastase capacity, keep the diastase active and at the same time act as conserving agents.

The neutralization of the lactic acid is in itself by no means new, since it has been used for a long time also in lactic acid manufacture and in the fermenting industries. Also in order to assist the formation of a peptonizing enzym produced by lactic acid bacteria, it has been repeatedly suggested to render harmless the lactic acid produced by constant neutralization by means of a supply of carbonate of lime. The present process however utilizes the well known means of neutralizing the lactic acid in a special manner for the purpose of rendering possible by repeated extraction the exhaustive separation of the diastase from the malt. The usefulness of such a repeated extraction has not been hitherto made known. Furthermore in addition to repeated extraction, it is also necessary to evaporate the extracts obtained with addition of reducing agents, if it is desired to attain completely the object of the process.

I have not herein claimed the process of producing malt extracts including the step of adding reducing salts, except in conjunction with the step of extracting in the presence of the material capable of preventing an increase in acidity. The addition of the reducing agents alone, is claimed in my copending application, Serial No. 837,866, filed herewith.

The following example illustrates a preferred form of execution of the process, but the invention is not limited thereto: 5000 kgs. of malt are placed in a suitable vessel and mixed with 25000 liters of water. 50 kg. of $CaCO_3$ (chalk) are added to the mixture and the whole is kept in a state of motion at 40° C., during one hour. This time, however, will vary with the amount of water used in the temperature of the mixture. After the mixture has been left to deposit, the liquid is separated from the malt in any suitable manner. Thereupon the remaining mixture of malt and $CaCO_3$ is again extracted with a further portion of water (25000 liters) and when the extraction is complete the liquid is drawn off. The extracted malt is then saccharified at a temperature of 65° to 66° C., and the wort is separated from the spent malt. A small amount of a reducing agent, is then added to the mixture of the two extracts and the wort, which is then evaporated in a vacuum, until the liquid reaches the consistency of syrup. If the formaldehyde derivative of the sodium salt of the sulfoxylic acid is used as the reducing agent the amount of the added salt may be 5 kg. for the whole of the mixed liquid.

I claim:

1. A process of making diastase preparations, which comprises repeatedly extracting the malt, in the presence of carbonate of lime, thereafter saccharifying the extracted malt at a temperature of 65 to 66° C., separating the wort from the extracted malt, adding the wort to the extract, and evaporating the liquid thus produced in a vacuum, together with a small amount of a strong reducing agent, until the liquid reaches the consistency of the syrup.

2. A process of producing a stable malt extract of high activity which comprises repeatedly extracting the same bulk of malt with successive portions of water, in the continued presence of an agent capable of preventing the accumulation of considerable percentages of free organic acids, thereafter saccharifying the extracted malt, separating the wort from the spent malt, adding the aqueous extract to the wort, and adding a strong reducing agent, and thereafter concentrating the said mixed liquid, at a relatively low temperature.

3. In the preparation of malt extracts, the step of successively extracting a body of malt with successive quantities of water, in the continued presence of a material capable of preventing accumulation of free acids therein.

4. In the preparation of malt extracts, the step of leaching malt in the continued presence of calcium carbonate.

5. As a new article of manufacture the herein described malt extract, said extract containing a relatively small amount of a salt of sulfoxylic acid.

ISIDOR POLLAK.

Witnesses:
   JOSEPH C. HADLER,
   AUGUST FUGGER.